Patented Oct. 14, 1941

2,259,396

UNITED STATES PATENT OFFICE 2,259,396

PROCESS OF RECOVERING NIOBIUM OXIDE FROM ITS ORES

Helmut Schlecht and Leo Schlecht, Ludwigshafen-on-the-Rhine, Germany, assignors, by mesne assignments, to Walter H. Duisberg, New York, N. Y.

No Drawing. Application December 12, 1939, Serial No. 308,824. In Germany December 29, 1938

5 Claims. (Cl. 23—19)

The present invention relates to a process of recovering oxides of titanium, vanadium, niobium or tantalum from raw materials containing the same.

It is known to decompose crudes containing titanium, vanadium, niobium and/or tantalum, with sulphuric acid. In this process, in addition to the compounds of the said metals also compounds of other metals such as of iron, aluminum, manganese, magnesium, barium and calcium, pass into solution, thus rendering it difficult to obtain pure titanic, vanadic, niobic and/or tantalic acid from the solution by hydrolysis.

We have now found that the latter compounds may be separated from the undesired accompanying substances in a far-reaching simple manner and without the use of precipitants by diluting the decomposition solution with water in stages. It has been found that the objectionable impurities precipitate in the single dilution stages separately from titanic, vanadic, niobic and tantalic acid. This is true particularly if the decomposition is carried through with sulphuric acid of a concentration of from about 80 to 90 per cent.

Thus it is possible to recover from many crudes, as ores and concentrates, practically pure oxyhydrates of titanium, vanadium, niobium or tantalum or at least to obtain a material enrichment of these compounds without the consumption of chemicals.

Especially the precipitation of earth alkali metal sulphates, in particular of the sulphates of barium and calcium, passed into solution may be completely effected, in most cases already in the first stage of dilution, by diluting the cooled decomposition solution with a quantity of water which only amounts to a very small proportion of its volume. The dilution may also be effected already before the decomposition solution is filtered off from the decomposition residue. The number of the filtrations required may thus be diminished.

Raising the temperature in stages in some cases promotes the separation of the various substances passed into solution.

The concentrated sulphuric acid decomposition solution contains both the desired elements titanium, vanadium, niobium and tantalum and the contaminating elements iron, aluminum, manganese and magnesium in the form of sulphates, whereas calcium and barium are present in the form of complex sulphates. The said complex sulphates are stable only in concentrated sulphuric acid solution and they are decomposed by adding only very small amounts of water to the said solution, whereby the insoluble sulphates of calcium and barium are precipitated. Water amounts of, for instance, only about one thirtieth of the volume of the decomposition solution are sufficient to effect this precipitation. In practice water is slowly and gradually added to the solution until calcium sulphate and barium sulphate respectively no longer precipitate.

The various metals still dissolved after this procedure and after the separation of the precipitates may now be precipitated by further additions of water in accordance with the different hydrolytic behaviour of these metal compounds. Generally speaking, a considerably greater amount of water is necessary for this hydrolysis than for the precipitation of the sulphates of calcium and barium. By dilution of the solution with about a volume of water equal to its own volume the sulphates of niobium and tantalum are hydrolytically split off. By simultaneously heating the solution a complete precipitation of the niobic and tantalic acid in a form capable of readily being filtered, is effected.

When adding further amounts of water to the solution separated from the precipitate, titanic acid is precipitated. Also this precipitation may be completed by heating. The acid concentrations at which niobic acid and tantalic acid precipitate on one side and titanic acid precipitates on the other side, are, however, not essentially differentiated, and therefore the separated niobic and tantalic acid, respectively, often contain small amounts of titanic acid.

In contradistinction thereto the separation of niobium, tantalum and titanium from the other elements still dissolved in the liquid, is a complete one, for the sulphates of vanadium, iron, aluminum, manganese and magnesium are still stable at considerably lower concentrations than those at which the sulphates of niobium, tantalum and titanium are hydrolytically decomposed.

The following example serves to illustrate how the present invention may be carried out in practice, but the invention is not restricted to the said example. The parts are by weight.

*Example*

100 parts of a niobium-containing concentrate containing 4.5 per cent of niobium oxide, 39 per cent of iron, 2.5 per cent of aluminum, 2.5 per cent of barium, 2 per cent of manganese, 2 per cent of calcium, 6 per cent of magnesium, 9 per cent of silicic acid and 0.7 per cent of titanium oxide, are heated with 300 parts of sulphuric acid of 90 per cent strength and evaporated with fuming for a short time. The decomposition solution is separated from the residue by centrifuging and then diluted with water by about one thirtieth of its volume. 8.8 parts of a grey-white precipitate are thus obtained which mainly consists of calcium sulphate and barium sulphate and contains only about 2 per cent of the amount of niobic acid contained in the initial material. The solution filtered off from this residue is further diluted with its own volume of water and then boiled up, thereby the total of niobic acid and part of the titanic acid contained therein being precipitated. This precipitate is filtered off and desiccated by heating. It contains 96 per cent of the niobic acid contained in the concentrate employed and consists of niobic acid to the extent of 95 per cent and of titanium oxide to the extent of 1 per cent.

What we claim is:

1. A process of obtaining niobic oxide from a concentrate containing a small quantity of niobic oxide, large quantities of iron, together with small quantities of aluminum, barium, calcium, titanium and other impurities which comprises reacting the concentrate with concentrated sulfuric acid to form a sulfate solution, separating the solution from the residue, diluting the solution with a small quantity of water to precipitate alkali earth metal sulfates, separating the solution from the precipitate, adding a large quantity of water to the solution and hydrolizing said diluted solution to precipitate niobium and part of the titanium while leaving the compounds of the other metals in solution.

2. In the process as claimed in claim 1 employing for the decomposition a sulphuric acid of a concentration of about from 80 to 90 per cent.

3. In the process as claimed in claim 1 adding in the first stage of dilution water amounts corresponding to about one thirtieth of the volume of the decomposition solution and in the following stage a water amount about equal to the volume of the solution separated from the precipitate of the first stage.

4. In the process as claimed in claim 1 increasing the temperature with the dilution stages.

5. In the process as claimed in claim 1 carrying out the hydrolysis at boiling temperatures.

HELMUT SCHLECHT.
LEO SCHLECHT.